US011233929B2

(12) United States Patent
Kawawa (10) Patent No.: US 11,233,929 B2
(45) Date of Patent: Jan. 25, 2022

(54) IMAGE CAPTURING APPARATUS, SYSTEM, CONTROL METHOD FOR IMAGE CAPTURING APPARATUS, AND NON-TRANSITORY COMPUTER-READABLE STORAGE MEDIUM THAT CONTROLS PROCESSING TO COMMUNICATE WITH A CLIENT BASED ON RECEIVED SETTING VALUE (71) Applicant: CANON KABUSHIKI KAISHA, Tokyo (JP)

(72) Inventor: Yasuhiro Kawawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 16/697,623

(22) Filed: Nov. 27, 2019

(65) Prior Publication Data
US 2020/0177791 A1 Jun. 4, 2020

(30) Foreign Application Priority Data

Dec. 3, 2018 (JP) .............................. JP2018-226726

(51) Int. Cl.
*H04N 5/232* (2006.01)
*H04N 1/00* (2006.01)
(Continued)

(52) U.S. Cl.
CPC ..... *H04N 5/23206* (2013.01); *H04N 1/00244* (2013.01); *H04N 1/00347* (2013.01);
(Continued)

(58) Field of Classification Search
CPC ...... H04N 5/23206; H04N 5/77; H04N 5/247; H04N 1/2116; H04N 1/00244;
(Continued)

(56) References Cited

U.S. PATENT DOCUMENTS 7,457,839 B2 11/2008 Nakamura et al.
7,576,770 B2 8/2009 Metzger
(Continued)

FOREIGN PATENT DOCUMENTS

CN 103888661 A 6/2014
CN 207443001 U 6/2018
(Continued)

OTHER PUBLICATIONS

Machine English Translation, JP 2018-125807 A, Iwata, Aug. 9, 2018 (Year: 2018).*

(Continued)

*Primary Examiner* — Nelson D. Hernández Hernández
(74) *Attorney, Agent, or Firm* — Venable LLP (57) ABSTRACT

An image capturing apparatus, comprising, an image capturing unit configured to capture an image, a communication unit configured to communicate with a client and a server via a network, and a processing unit configured to execute first processing for communication with the client and second processing for communication with the server, wherein the communication with the client and the communication with the server include transmission of the image, and after the first processing and the second processing have been started, the processing unit stops the first processing when the communication unit has established the communication with the server, and does not stop the first processing when the communication unit has not established the communication with the server.

12 Claims, 9 Drawing Sheets (51) Int. Cl.
*G06F 11/14* (2006.01)
*H04N 1/327* (2006.01)
*H04N 1/21* (2006.01)
*H04N 5/77* (2006.01)

(52) U.S. Cl.
CPC ....... *H04N 1/2116* (2013.01); *H04N 1/32767* (2013.01); *H04N 5/77* (2013.01); *G06F 11/1443* (2013.01); *H04N 2201/0015* (2013.01); *H04N 2201/0084* (2013.01)

(58) Field of Classification Search
CPC .......... H04N 1/00347; H04N 1/32767; H04N 2201/0015; H04N 2201/0084; H04N 7/181; G06F 11/1443; G06F 2201/86
See application file for complete search history.

(56) References Cited

U.S. PATENT DOCUMENTS

| | | | |
|---|---|---|---|
| 9,906,581 B2 | 2/2018 | Okubo | |
| 2006/0136972 A1* | 6/2006 | Metzger | G08B 13/19689 725/105 |
| 2013/0336627 A1 | 12/2013 | Calvert | |
| 2015/0222601 A1 | 8/2015 | Metz | |
| 2016/0105644 A1 | 4/2016 | Smith | |
| 2017/0195386 A1* | 7/2017 | Nathan | H04L 69/40 |

FOREIGN PATENT DOCUMENTS

| | | |
|---|---|---|
| JP | 2005-165750 | 6/2005 |
| JP | 2013251588 A | 12/2013 |
| JP | 2015-125657 | 7/2015 |
| JP | 2018-125807 A | 8/2018 |
| JP | 2018125807 A * | 8/2018 |

OTHER PUBLICATIONS

Extended European Search Report dated Mar. 20, 2020 in counterpart European Patent Application No. 19209918.2.
Japanese Office Action dated Oct. 26, 2020 in counterpart Japanese Patent Application No. 2018-226726.
Chinese Office Action dated Mar. 3, 2021 in counterpart Chinese Patent Application No. 201911179766.X.
Chinese Office Action issued in corresponding Chinese Application No. 201911179766.X dated Dec. 2, 2021.

* cited by examiner

IMAGE CAPTURING APPARATUS, SYSTEM, CONTROL METHOD FOR IMAGE CAPTURING APPARATUS, AND NON-TRANSITORY COMPUTER-READABLE STORAGE MEDIUM THAT CONTROLS PROCESSING TO COMMUNICATE WITH A CLIENT BASED ON RECEIVED SETTING VALUE

BACKGROUND OF THE INVENTION

Field of the Invention

The present disclosure relates to an image capturing apparatus, a system, a control method for an image capturing apparatus, and a non-transitory computer-readable storage medium.

Description of the Related Art

Network cameras have been offering a Web service function that provides images to a client in response to a request from the client. In recent years, network cameras can also operate as a client, and transmit images by connecting to a cloud server.

There are known techniques that, when there are multiple usages or when there are multiple connections as described above, stop the execution of unnecessary services and functions and do not accept requests for such services and functions. Japanese Patent Laid-Open No. 2005-165750 discloses a technique to determine whether to accept an access request depending on whether there is an optional function that has been added. Also, Japanese Patent Laid-Open No. 2015-125657 discloses a technique to establish multiple connections with a server, and maintain another connection until the obtainment of a certain content is complete.

Meanwhile, considering a case where a network camera is used as a cloud client, as images and settings are transmitted and received via a cloud server, there is no need for the network camera itself to provide a Web service that returns a response in reply to a request from a general client. Furthermore, there is demand to stop a Web service because, by stopping the Web service, an access to a network camera from the general public can be prevented, and improvements in security are expected.

However, with the techniques disclosed in the above-mentioned patent documents, if a Web service is stopped when a network camera is operating as a cloud client, in the event of a failure to connect to a cloud, it is difficult to determine whether the failure has occurred because there is a problem in a path to a cloud server or because there is a problem in the network camera itself.

SUMMARY OF THE INVENTION

In view of the above, a technique is provided that makes it possible to identify the cause of the occurrence of a failure while improving security of a network camera.

One aspect of exemplary embodiments relates to an image capturing apparatus, comprising an image capturing unit configured to capture an image, a communication unit configured to communicate with a client and a server via a network, and a processing unit configured to execute first processing for communication with the client and second processing for communication with the server, wherein the communication with the client and the communication with the server include transmission of the image, and after the first processing and the second processing have been started, the processing unit stops the first processing when the communication unit has established the communication with the server, and does not stop the first processing when the communication unit has not established the communication with the server.

Further features of the invention will become apparent from the following description of exemplary embodiments (with reference to the attached drawings).

DESCRIPTION OF THE EMBODIMENTS

First Embodiment

Figure 1:
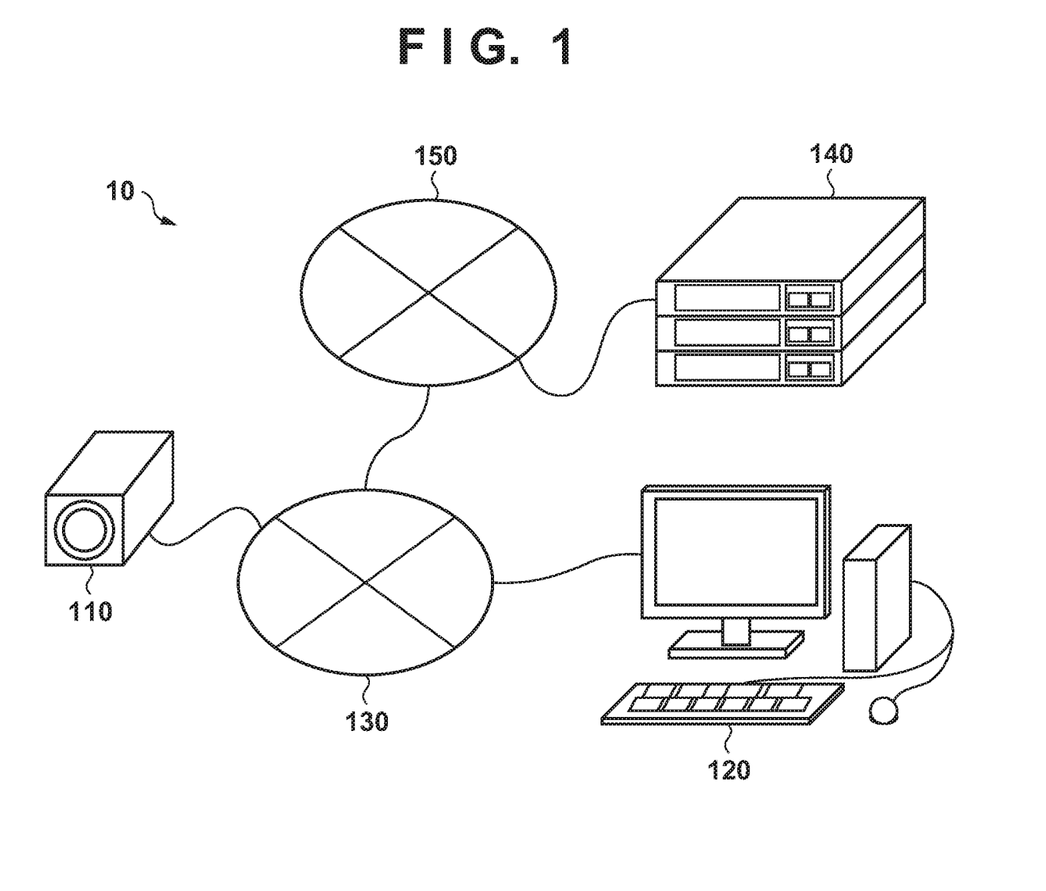
FIG. 1 is a diagram showing an example of a system configuration corresponding to an exemplary embodiment.

Below, an exemplary embodiment will be described in detail based on the attached drawings. FIG. 1 is a diagram showing an example of a configuration of a system 10 corresponding to the embodiment. The system 10 corresponding to the present embodiment is configured in such a manner that a network camera 110 and a client 120 are connected via a local network 130, and a cloud server 140 is connected via a wide area network 150.

The network camera 110 is an image capturing apparatus (or a shooting apparatus, an image generation apparatus, a communication apparatus) that includes an image capturing unit and distributes captured images to the client 120 via the local network 130. The network camera 110 also transmits captured images to the cloud server 140 via the local network 130 and the wide area network 150.

The client 120 is a client apparatus that can access the network camera 110, obtain images, change the settings of the network camera 110, and perform camera control, such as focus control. Meanwhile, the client 120 can also obtain images held by the cloud server 140 via the local network 130 and the wide area network 150. In addition, the client 120 can configure the settings of the network camera 110 via the cloud server 140. The client 120 can be realized as, for example, an arbitrary information processing apparatus, communication apparatus, terminal apparatus, or the like, such as a personal computer (PC), a mobile telephone, a smartphone, and a tablet terminal.

The cloud server 140 is a server apparatus that accepts a connection request from the network camera 110, and receives and stores images. Furthermore, the cloud server 140 distributes stored images in response to an image obtainment request from the client 120, and also transmits various types of settings stored by the client 120 to the network camera 110.

Although it is assumed that there is one network camera for simple explanation, there may be two or more network cameras. Moreover, there may be another client that accesses the network camera 110 and receives and accumulates images, in addition to the client 120. The local network 130 and the wide area network 150 are composed of a plurality of routers, switches, cables, and so forth that satisfy the communication standards of, for example, Ethernet®. In the present disclosure, as long as the individual network cameras and clients can communicate with one another with no problem, no restriction is placed on the communication standard, size, and configuration. Therefore, the target of application ranges from the Internet to a LAN (Local Area Network).

Next, an example of a hardware configuration of the network camera 110 will be described with reference to FIG. 2A. As the hardware configuration of the network camera 110 of the present embodiment, a CPU 201, a primary storage apparatus 202, a secondary storage apparatus 203, an image capture interface (I/F) 205, a network I/F 207, and a camera control I/F 208 are connected to one another via an internal bus 204. Here, the primary storage apparatus 202 is a readable and writable high-speed storage apparatus, which is typically a RAM, on which an OS, various types of programs, and various types of data are loaded, and which is also used as a work area for the OS and various types of programs.

The secondary storage apparatus 203 is a nonvolatile storage apparatus, which is typically a flash memory, an HDD, an SD card, or the like, which is used as a permanent storage area for the OS, various types of programs, and various types of data, and which is also used as a temporary storage area for various types of data. The details of various types of programs and the like stored in the primary storage apparatus 202 and the secondary storage apparatus 203 of the network camera 110 will be described later.

The image capture I/F 205 is connected to a camera unit 206 composed of an image sensor, such as a CCD and a CMOS, and a lens, converts and compresses image data obtained from the camera unit 206 into a predetermined format, and transfers the resultant image data to the primary storage apparatus 202. The camera control I/F 208 is also connected to the camera unit 206; various types of camera control are transferred to the camera unit 206, and the control results are returned to the camera control I/F 208. The network I/F 207 is an I/F for connecting to the aforementioned network 130, and takes charge of communication with the client 120 and the like via a communication medium, such as Ethernet.

Next, an example of a software-based functional configuration of the network camera 110 will be described with reference to FIG. 2B. Programs that enable the CPU 201 to function as one of an operating system (OS) 210, a server processing unit 211, a camera control unit 212, an image generation unit 213, a search response unit 214, and a cloud processing unit 215 are loaded on the primary storage apparatus 202. The CPU 201 can function as each processing block as the CPU 201 executes each of the loaded programs.

The following describes the functions fulfilled by each processing block. The OS 210 controls the entirety of the network camera 110. Typical functions of the OS 210 include: management of the secondary storage apparatus 203, such as a file system; memory management, such as virtual storage; process management, such as multitasking; and management of the network I/F 207. The server processing unit 211 is a processing unit that performs processing for communication with the client 120, and in response to a request received from the client 120, performs processing that involves distribution of image data generated by the image generation unit 213, control information included in the request, obtainment of information, and so forth. The server processing unit 211 can function as a so-called Web server for the client 120; in the present embodiment, it is assumed that processing executed by the server processing unit 211 includes a part of a Web service. The server processing unit 211 provides a Web service that, in response to a request, performs relay to the image generation unit 213 and the camera control unit 212, and transmits a corresponding response to the client 120 based on the results from the relay destinations. The server processing unit 211 communicates with an external apparatus via the network I/F 207 and the local network 130.

The camera control unit 212 adjusts camera functions based on control information received from the server processing unit 211. The adjustment typically involves control of the camera unit 206 and notification of the control results. Control information includes, for example, focus control that determines a lens position. The image generation unit 213 generates, via the image capture I/F 205, image data that was generated by the camera unit 206. Then, the generated image data is encoded. An encoding method may be JPEG, or an encoding method that involves image compression, such as H.264/AVC and H.265/HEVC, is applicable. Note that in addition to the encoding method of the present embodiment, another image compression method may be used.

The search response unit 214 responds to, for example, a request from the client 120 to search for a service of the network camera 110 in the network. In the present embodiment, it is assumed that a response to the search request is also included in the Web service. The response to the search request may be Zeroconf, typically multicast DNS, or may be UPnP (Universal Plug and Play), WS-Discovery (Web Services Dynamic Discovery), or the like; besides these, the response may be embodied in any way as long as a device search can be realized. Although the search response unit 214 and the server processing unit 211 are provided independently in the description of the present embodiment, the functions of the search response unit 214 may be included in the server processing unit 211.

The cloud processing unit 215 is a processing unit that performs processing for communication with the cloud server 140; it exchanges information with the cloud server 140, and also processes information received from the cloud server 140. The cloud processing unit 215 issues a connection request to the cloud server 140, and transmits image data generated by the image generation unit 213 in response to an obtainment request from the cloud server 140. Furthermore, the cloud processing unit 215 receives settings and control information from the cloud server 140, and configures/performs various types of settings/control on the network camera 110. Various types of settings include stopping and starting of the Web service. Upon receiving a setting to stop the Web service, operations of the server processing unit 211 and the search response unit 214 are stopped, and the Web service is stopped. On the other hand, upon receiving a setting to start the Web service, the server processing unit 211 and the search response unit 214 are activated, and the Web service is started. In addition to the settings of the Web service, the state of connection with the cloud server 140 may be taken into consideration in controlling the stopping and starting of the Web service. Furthermore, in response to a request, the cloud processing unit 215 performs relay to the image generation unit 213 and the camera control unit 212, and transmits a corresponding response to the cloud server 140 based on the results from the relay destinations.

Figure 3:
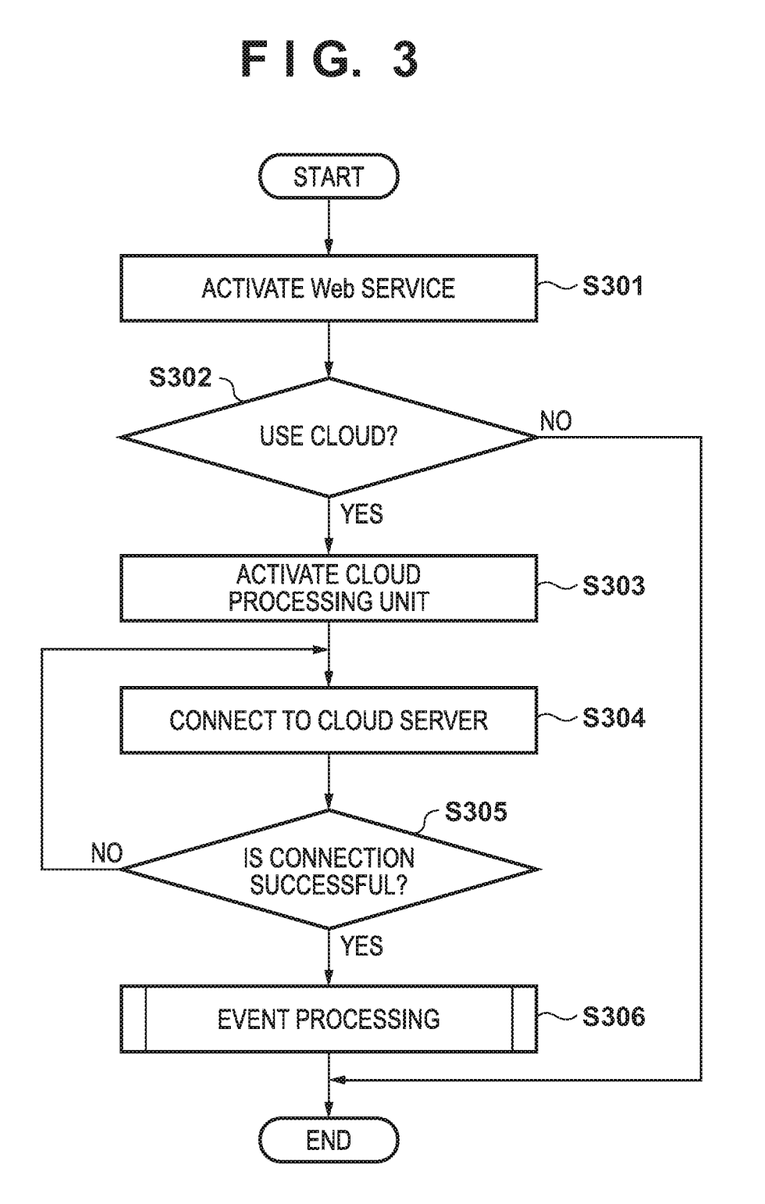
FIG. 3 is a flowchart showing an example of processing for the time of activation of the network camera corresponding to an exemplary embodiment.

Next, a flow of processing in the present embodiment will be described. FIG. 3 is a flowchart showing an example of processing for controlling the Web service in accordance with the state of connection with the cloud server 140 at the time of activation of the network camera 110. The processing of FIG. 3 can be started, for example, when the power of the network camera 110 is turned on.

First, in step S301, the CPU 201 activates the Web service by starting operations as the server processing unit 211 and the search response unit 214. Next, in step S302, the CPU 201 determines whether to use a cloud based on a setting value stored in the primary storage apparatus 202. This setting value is set in advance by the client 120 or the cloud server 140 via, for example, the server processing unit 211, and is stored into the primary storage apparatus 202 and the secondary storage apparatus 203. On the client 120, a user can select one of a setting in which the cloud (cloud server 140) is used in relation to the network camera 110 and a setting in which the cloud is not used, and this setting value can be either transmitted directly to the network camera 110 or provided via the cloud server 140.

If it is determined that the setting is to use the cloud in step S302, the processing proceeds to step S303. On the other hand, if it is determined that the setting is not to use the cloud, the present processing ends. In step S303, the CPU 201 activates the cloud processing unit 215 by starting operations as the cloud processing unit 215 through the execution of a predetermined program. In the next step S304, the CPU 201 makes an attempt to connect to the cloud server 140 as the cloud processing unit 215. More specifically, a TCP connection is established by performing a three-way handshake of TCP, and then an HTTP request is transmitted with the establishment of a TLS (Transport Layer Security) connection.

Thereafter, in step S305, the CPU 201 determines whether the connection with the cloud server 140 has succeeded as the cloud processing unit 215. If it is determined that the connection has succeeded, the processing proceeds to step S306. In step S306, the CPU 201 executes event processing as the cloud processing unit 215. In the event processing, starting and stopping of the Web service are controlled depending on whether the connection has been enabled. On the other hand, if it is determined that the connection has failed in step S305, the processing returns to step S304, and the connection attempt is made again. The details of the event processing of step S306 will be described later with reference to FIG. 4. Once the CPU 201 has executed the event processing, the present processing ends.

Figure 4:
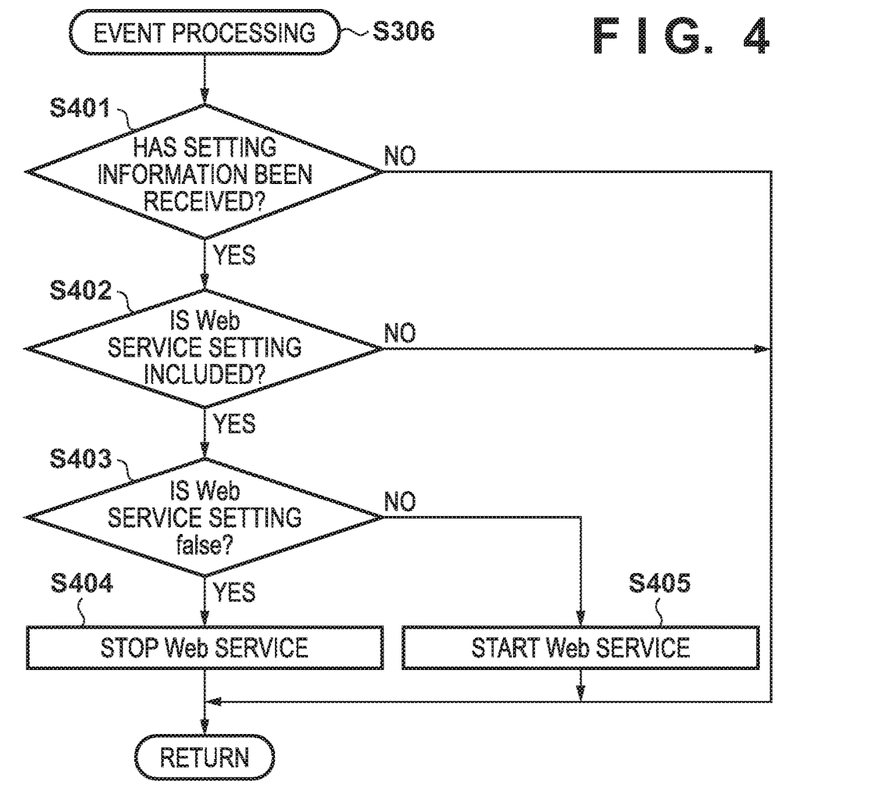
FIG. 4 is a flowchart showing an example of event processing corresponding to an exemplary embodiment.

Next, the details of the event processing in step S306 of FIG. 3 will be described with reference to FIG. 4. This processing can be started not only at the timing of the event processing of step S306, but also on the occurrence of an event from the cloud server 140.

First, in step S401, the CPU 201 determines whether setting information has been received from the cloud server 140 as the cloud processing unit 215. If it is determined that the setting information has been received, the processing proceeds to step S402. On the other hand, if it is determined that the setting information has not been received, the present processing ends. In step S402, the CPU 201 determines whether a Web service setting is included in the received setting information as the cloud processing unit 215. If it is determined that the Web service setting is included, the processing proceeds to step S403. On the other hand, if it is determined that the Web service setting is not included, the present processing ends.

In step S403, the CPU 201 determines whether a setting value of the received Web service setting is false (a setting indicating no usage) as the cloud processing unit 215. If it is determined that the setting value of the Web service setting is false in step S403, the processing proceeds to step S404, and the CPU 201 stops the Web service by stopping operations as the server processing unit 211 and the search response unit 214. On the other hand, if it is determined that the value of the Web service setting is not false but true in step S403, the processing proceeds to step S405, and the Web service is started. This is processing that runs when the setting information has been received from the cloud server 140 after the activation of the network camera 110. After steps S404 and S405, the present processing ends.

In the present embodiment, as has been described with reference to FIG. 4, it is determined that the connection with the cloud server 140 has become enabled when the value of the Web service setting is false. Besides this, examples of a case where the connection can be determined to have become enabled include a case where the cloud processing unit 215 has received an authentication success response when connecting to the cloud server 140, a case where the cloud processing unit 215 has received a camera control request from the cloud server 140, and a case where the cloud processing unit 215 has received an image transmission request from the cloud server 140.

Furthermore, when the network camera 110 has an LED, the LED can be used to provide a notification (also referred to as display, an announcement, or the like) regarding the state of communication between the cloud processing unit 215 and the cloud server 140. For example, the LED may be used to notify a user of whether the connection with the cloud server 140 has become enabled. The LED may be used not only when the connection with the cloud server 140 has become enabled, but also for another purpose, and in addition, the LED may have a single color. It is common that the LED has three patterns, namely off, steady-on, and flash, and it is possible to set, via a user setting, whether the LED is steadily on or flashes while the network camera 110 is operating. Because the three patterns are all used, it is difficult to represent a notification that uniquely indicates a state until the connection with the cloud server 140 becomes enabled.

Figure 2A:
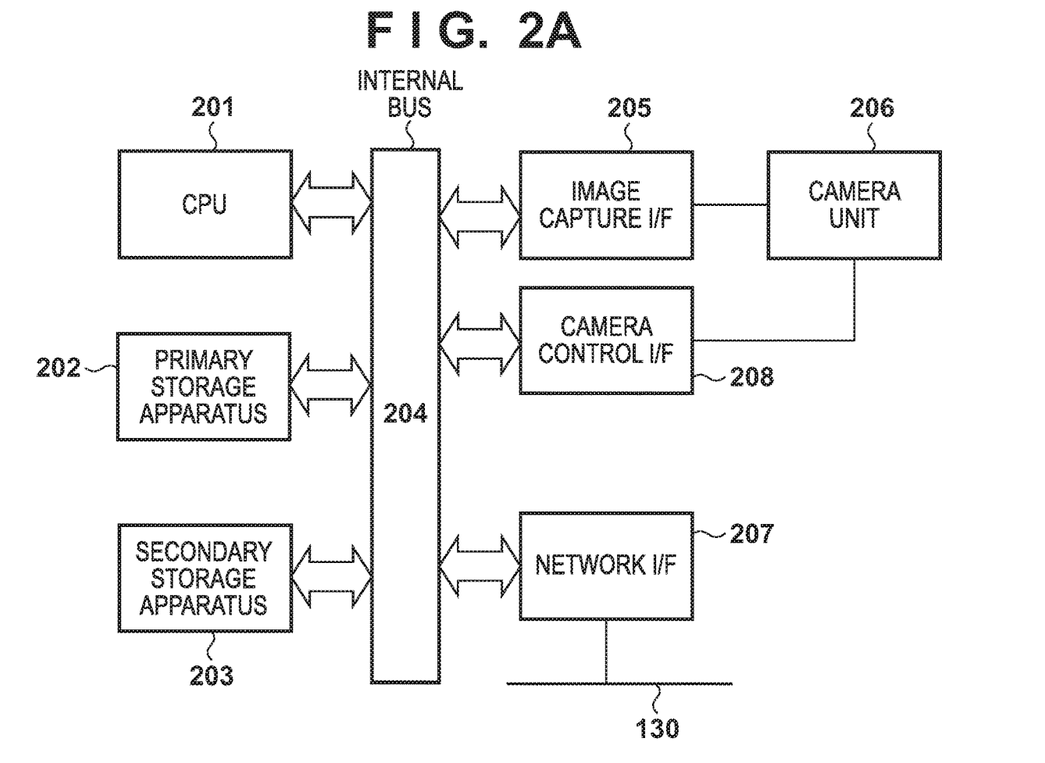
FIG. 2A is a diagram showing an example of a hardware configuration of a network camera corresponding to an exemplary embodiment.
Figure 2B:
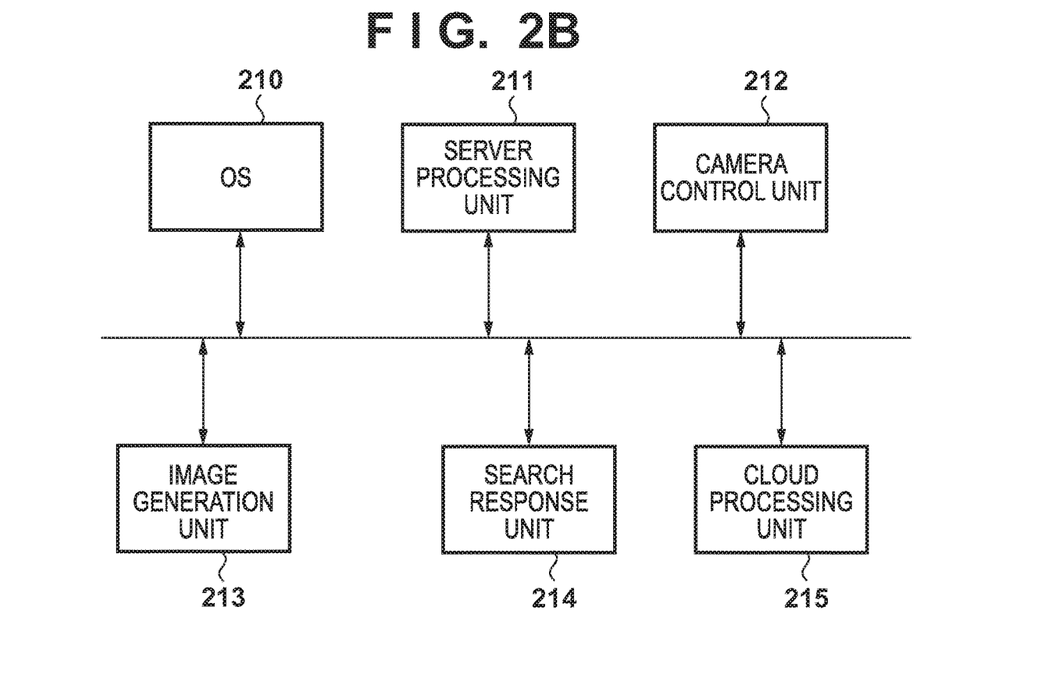
FIG. 2B is a diagram showing an example of a software configuration of the network camera corresponding to an exemplary embodiment.

An example of another purpose of use is rewriting of the secondary storage apparatus 203 at the time of an operation of deleting the setting values of the network camera 110 to restore initial settings, or a firmware update operation of updating the software of the network camera 110 shown in FIG. 2B. Unplugging the power during the update of the secondary storage apparatus 203 will give rise to a problem in which the software of FIG. 2B malfunctions and does not recover. Therefore, time until the connection with the cloud server becomes enabled and the update of the secondary storage apparatus 203 are represented by different patterns. They can be distinguished from each other by, for example, changing a flashing pattern. More specifically, for example, an interval between steady-on and steady-on during flashing may be changed.

As described above, in the present embodiment, the Web service is activated upon activation of the network camera 110, and thereafter, connection is made with the cloud server 140, and an inquiry about whether to continue the Web service is made to the cloud server 140. Then, in accordance with a value of a Web service setting provided by the cloud server 140, starting or stopping of the Web service are controlled; in this way, whether or not to continue the Web service can be determined after securing the connection between the cloud server 140 and the network camera 110. Furthermore, when connection cannot be made with the cloud server 140, the activated state of the Web service is maintained. Therefore, even if the connection with the cloud fails when the network camera 110 is operating as a cloud client, the cause of the occurrence of this failure can be identified. Also, while the cause of the occurrence of the failure can be identified, an access to the network camera 110 from the general public can be prevented by stopping the Web service, thereby maintaining security. In addition, even when connection cannot be made with the cloud server 140, as the Web service is in the activated state, cause analysis can be promptly performed on the occurrence of the failure.

Second Embodiment

The following describes a second embodiment. In the above-described first embodiment, starting and stopping of the provision of the Web service are controlled in accordance with a Web service setting when the connection between the network camera 110 and the cloud server 140 has been established. In contrast, in the present embodiment, the state of connection between the network camera 110 and the cloud server 140 is monitored, and even if the state of connection has changed, for example, if the connection has been established, the state of the provision of the Web service is maintained without being changed for a certain period.

A configuration of a system and a hardware configuration and a software configuration of a network camera corresponding to the present embodiment are similar to those shown in FIGS. 1, 2A and 2B; thus, their descriptions are omitted.

Figure 5:
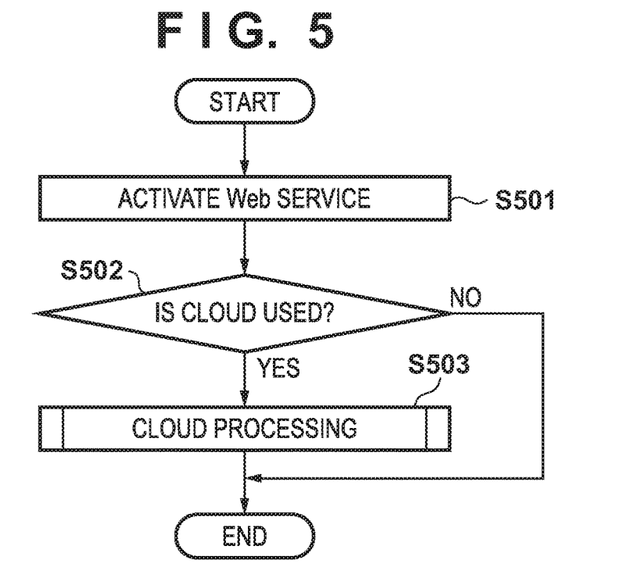
FIG. 5 is a flowchart showing an example of processing for stopping a Web service in accordance with the state of connection corresponding to an exemplary embodiment.

The following describes processing in the network camera 110 corresponding to the present embodiment with reference to FIG. 5. FIG. 5 is a flowchart showing an example of processing for stopping the Web service in accordance with the state of connection in the network camera 110. The present processing can be started, for example, when the power of the camera is turned on.

Once the processing has been started, the CPU 201 first activates the Web service by starting operations as the server processing unit 211 and the search response unit 214 through the execution of a predetermined program in step S501. Next, in step S502, the CPU 201 determines whether to use a cloud based on a setting value stored in the primary storage apparatus 202. This determination is similar to the process of step S302 of FIG. 3. If it is determined that the setting is to use the cloud, the processing proceeds to step S503, and if it is determined that the setting is not to use the cloud, the present processing ends. In step S503, the CPU 201 starts operations as the cloud processing unit 215 through the execution of a predetermined program, and executes cloud processing. Thereafter, the present processing ends.

Figure 6:
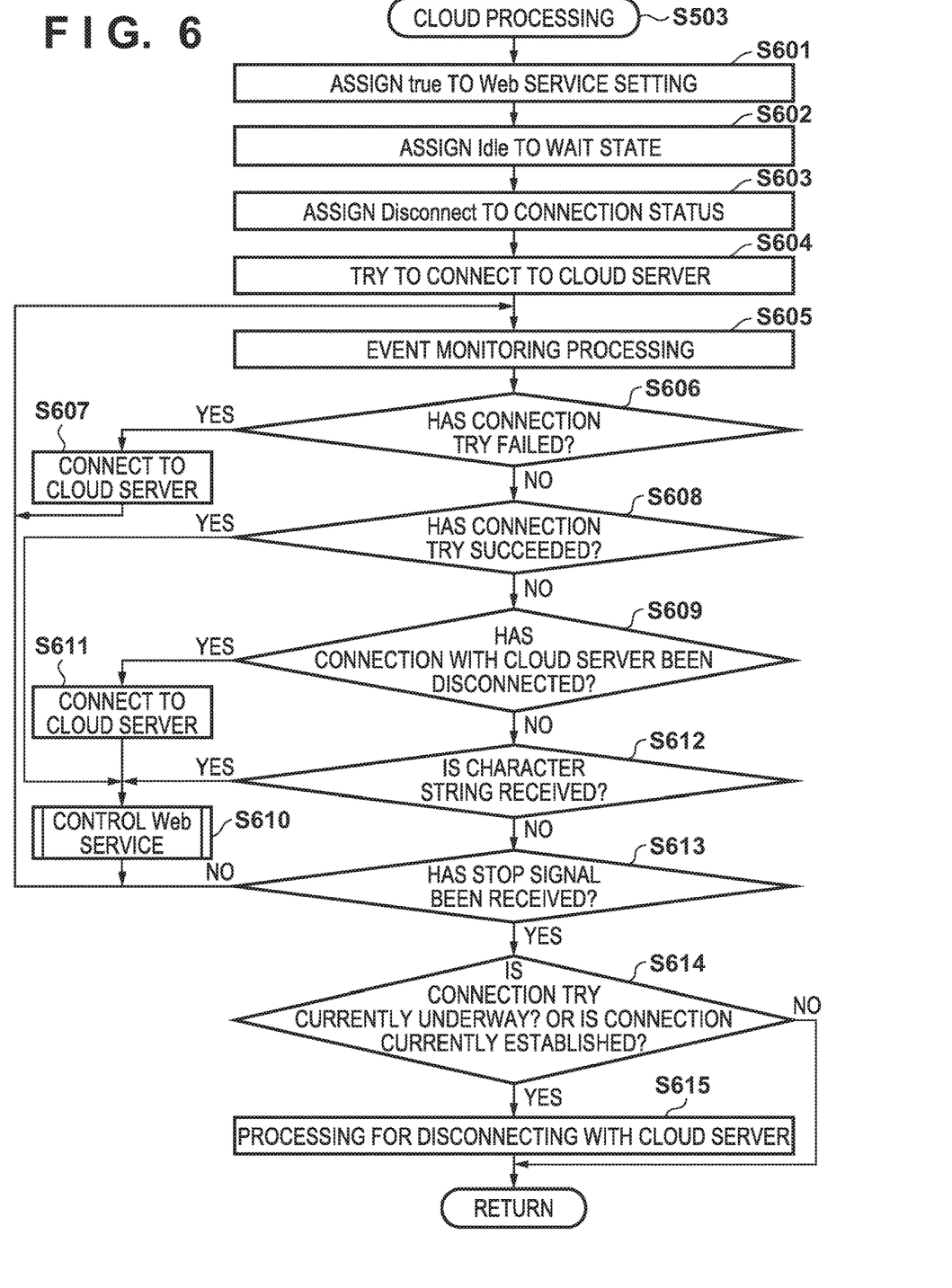
FIG. 6 is a flowchart showing an example of cloud processing corresponding to an exemplary embodiment.

Next, the details of the cloud processing in step S503 of FIG. 5 will be described with reference to FIG. 6. FIG. 6 is a flowchart of processing that is executed by the cloud processing unit 215 in confirming the state of connection. As has been described using FIG. 5, the cloud processing unit 215 is activated and starts the processing in the case of the setting in which the cloud is used.

After the processing has been started, in steps S601 to S603, the cloud processing unit 215 first performs the initial setting of values indicating the states (statuses) to be used in control of the Web service in step S610. There are three states used in control of the Web service: "Web service setting", "connection status", and "wait state". A setting value of the Web service setting is one of "true" and "false", which respectively mean that the Web service is to be used and the Web service is not to be used. As the "connection status", a value indicating the state of connection with the cloud server 140 is set; a value indicating the connected state is "Connect", and a value indicating the disconnected state is "Disconnect". Furthermore, a setting value of the "wait state" is one of the following two types: "Idle" and "Wait". The setting value is Idle in the initial state; it changes to Wait when the actual state of connection with the cloud server 140 is changing (the duration of the change), and remains Idle when such a change is not occurring.

In the present embodiment, the duration of the change in the state of connection denotes, for example, a state until a certain period elapses after the state of connection changed from disconnected to connected, or from connected to disconnected. Alternatively, the duration of the change in the state of connection denotes a state until the disconnected state is restored before the certain period elapses after the state of connection changed from disconnected to connected, or a state until the connected state is restored before the certain period elapses after the state of connection changed from connected to disconnected. In the present embodiment, the certain period is set as a timeout period, and measuring of the timeout period is started when the state of connection has changed.

In step S601, the cloud processing unit 215 assigns true to the setting value of the Web service setting as an initial value. In the next step S602, the cloud processing unit 215 assigns Idle to the setting value of the wait state as an initial value. In the next step S603, the cloud processing unit 215 assigns Disconnect to the setting value of the connection status as an initial value. In the next step S604, the cloud processing unit 215 tries to connect to the cloud server 140. Thereafter, in step S605, the cloud processing unit 215 performs connection event monitoring. The connection event monitoring in the present embodiment is an operation of monitoring events that are related to connection between the network camera 110 and the cloud server 140. The monitored events include a successful event in which the connection try has succeeded, a failure event in which the connection try has failed, a disconnection event in which the connected state has changed to the disconnected state, and an event in which a character string has been received.

In step S606, the cloud processing unit 215 determines whether the connection try has failed as a result of monitoring. If it is determined that the connection try has failed, the processing proceeds to step S607, and the cloud processing unit 215 makes an attempt to connect to the cloud server 140 again. Thereafter, the connection event monitoring is performed again in step S605. If it is determined that the event is not a failure in the connection try in step S606, the processing proceeds to step S608. In step S608, the cloud processing unit 215 determines whether the event is a success in the connection try. If it is determined that the event is a success in the connection try, the processing proceeds to step S610, and the Web service is controlled. Regarding the control of the Web service, activation and stopping of the Web service are controlled using the three state values that were initialized in steps S601, S602, and S603. The details of processing of step S610 will be described later with reference to FIG. 7.

If it is determined that the event is not a success in the connection try in step S608, the processing proceeds to step S609, and the cloud processing unit 215 determines whether the event is disconnection of connection with the cloud server 140. If it is determined that the event is disconnection, the processing proceeds to step S611. In step S611, the cloud processing unit 215 makes an attempt to connect to the cloud server 140 again. After the connection try, the Web service is controlled in step S610, and processing of the connection event monitoring is performed in step S605. Thereafter, whether the event is a failure in the connection try is determined in step S606, and whether the event is a success in the connection try is determined in step S608; these steps are followed by their respective branch processes.

If it is determined that the event is not disconnection of connection with the cloud server 140 in step S609, the processing proceeds to step S612. In this case, which is equivalent to a case where a character string has been received from the cloud server 140, the cloud processing unit 215 determines whether the event is the reception of the character string in step S612. If it is determined that the event is the reception of the character string in step S612, the processing branches into step S610, and the Web service is controlled. After the control of the Web service of step S610, the processing of the connection event monitoring of step S605 is performed. The details of the processing of step S610 will be described later with reference to FIG. 7. If it is determined that the event is not the reception of the character string in step S612, the processing branches into step S613.

In step S613, the cloud processing unit 215 determines whether a stop signal has been received. If it is determined that the stop signal has been received in step S613, the processing branches into step S614, and termination processing is started. If it is determined that the stop signal has not been received, the processing branches into step S605, and the processing of the connection event monitoring is performed. In step S614, the cloud processing unit 215 determines whether the connection try is currently underway or the connection is currently established. If it is determined that the connection try is currently underway or the connection is currently established in step S614, the processing branches into step S615, and processing for disconnecting the connection with the cloud server 140 is performed. Thereafter, the present processing ends. On the other hand, if it is determined that the connection try is not currently underway and the connection is not currently established and is disconnected in step S614, the present processing ends. The end of the processing makes a return to step S503 of FIG. 5, which is a call source.

Figure 7:
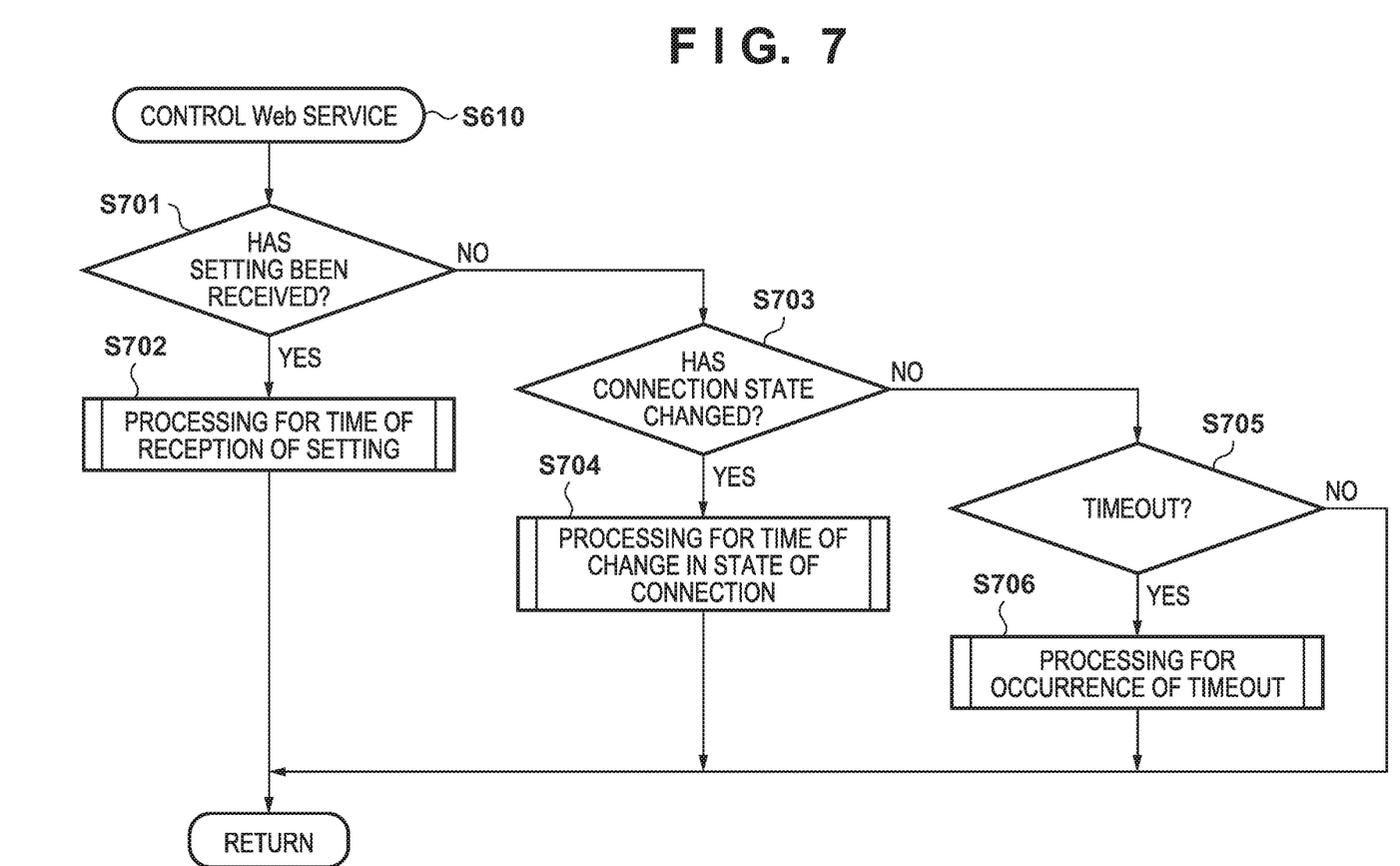
FIG. 7 is a flowchart showing an example of control of the Web service corresponding to an exemplary embodiment.

Next, the details of the processing for controlling the Web service in step S610 of FIG. 6 will be described with reference to FIG. 7. The present processing is called in step S610 of FIG. 6, for example, when a setting has been received from the cloud server 140, when the state of connection with the cloud server 140 has changed, and when the timeout period has elapsed.

First, setting information can be received from the cloud server 140 when the connection with the cloud server 140 is established. Thus, in step S701, the cloud processing unit 215 determines whether the setting information has been received from the cloud server 140. If it is determined that the setting information has been received, the processing proceeds to step S702. In step S702, the cloud processing unit 215 performs processing for the time of reception of a setting, and ends the present processing. The details of the processing for the time of reception of a setting in step S702 will be described later with reference to FIG. 8.

If it is determined that the setting information has not been received in step S701, the processing proceeds to step S703, and the cloud processing unit 215 determines whether the state of connection has changed. As the processing of step S610 is executed after it is determined that the connection try has succeeded in step S608 or after it is determined that the connection with the cloud server has been disconnected in step S609, whether the state of connection has changed is determined in correspondence with these cases. If it is determined that the state of connection has changed, the processing branches into step S704. If it is determined that the state of connection has not changed, the processing branches into step S705. In step S704, the cloud processing unit 215 performs processing for the time of change in the state of connection, and ends the present processing. The details of the processing of step S704 will be described later with reference to FIG. 9.

In step S705, the cloud processing unit 215 determines whether the timeout period has elapsed. As will be described with reference to FIG. 9, when the wait state is set to Wait, a timeout is registered, and an elapsed period since the start of the connected state is measured. In step S705, whether this elapsed period has reached the timeout period is determined. If it is determined that the elapsed period has reached the timeout period in step S705, the processing branches into step S706. If it is determined that the elapsed period has not reached the timeout period, the present processing ends. In step S706, the cloud processing unit 215 performs processing for the occurrence of the timeout. The details of the processing of step S706 will be described later with reference to FIG. 10.

Figure 8:
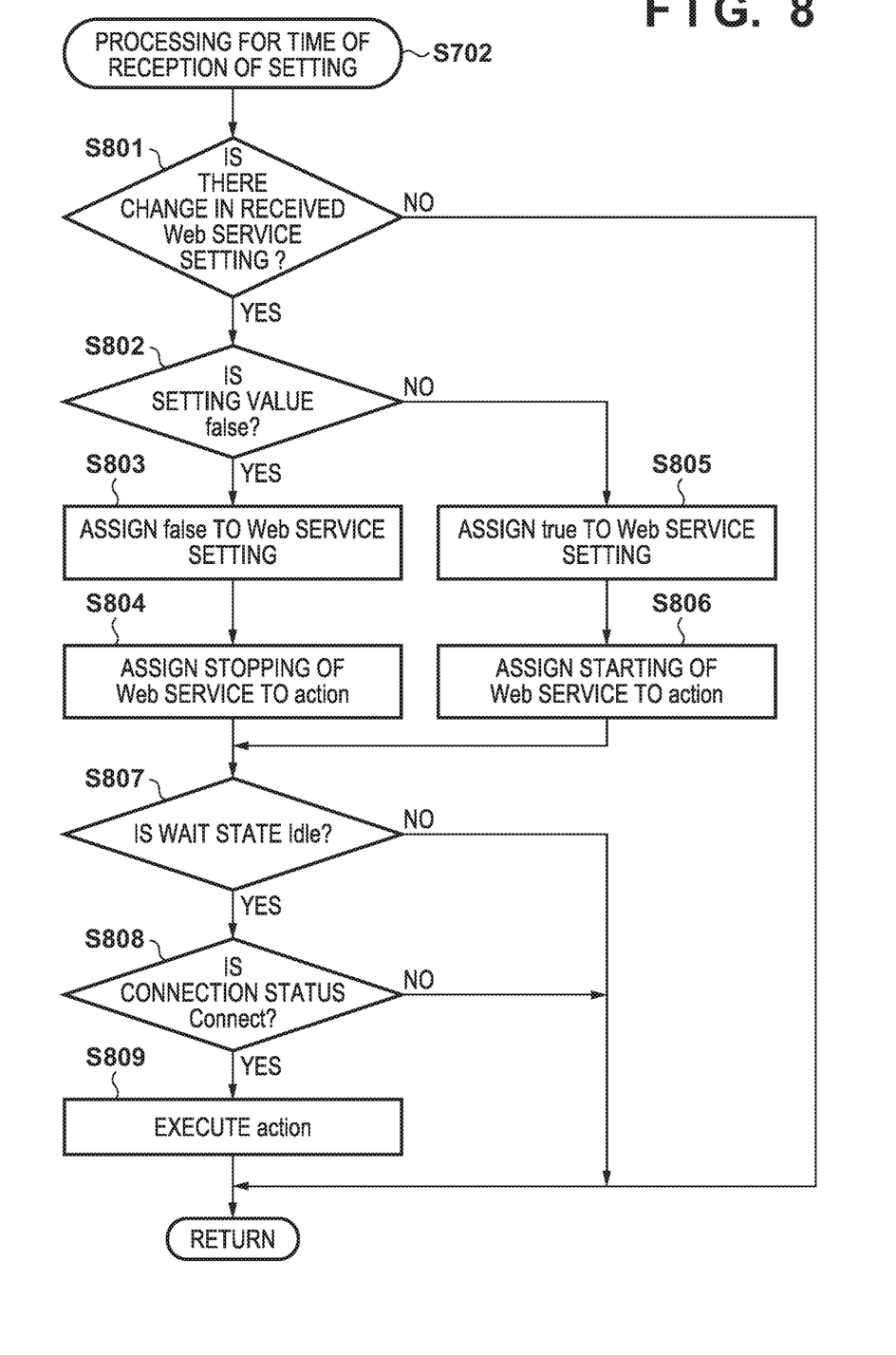
FIG. 8 is a flowchart showing an example of processing for the time of reception of a setting corresponding to an exemplary embodiment.

Next, the details of the processing in step S702 of FIG. 7 will be described with reference to FIG. 8. FIG. 8 is a flowchart showing an example of processing that is executed by the cloud processing unit 215 when setting information has been received from the cloud server 140. This processing is executed in step S702 of FIG. 7 when a setting has been received from the cloud server.

First, in step S801, the cloud processing unit 215 determines whether there is a change in the received Web service setting. Here, a case where there is a change denotes a case where the setting value of the Web service setting has been changed from false to true, or a case where the setting value has been changed from true to false. If it is determined that there is a change, the processing branches into step S802. If it is determined that there is no change, the present processing ends.

The cloud processing unit 215 holds the setting value of the Web service setting that was received before, and determines that there is a change in the Web service setting when the newly received setting value is different from the held setting value. The CPU 201, which functions as the cloud processing unit 215, can hold a setting value of the Web service setting in the primary storage apparatus 202 when the setting value has been received from the cloud server 140. Upon newly receiving the Web service setting, the CPU 201 updates the previous setting value held in the primary storage apparatus 202 to the newly received setting value.

In step S802, the cloud processing unit 215 determines whether the received setting value of the Web service setting is false. If it is determined that the setting value is false, the processing branches into step S803, false is assigned to the setting value of the Web service setting, and furthermore, stopping of the Web service is assigned to an action as a callback, which is executed later, in step S804.

If it is determined that the setting value is true in step S802, the processing branches into step S805, the cloud processing unit 215 assigns true to the Web service setting, and assigns starting of the Web service to the action as the callback, which is executed later, in step S806. After steps S804 and S806, the processing proceeds to step S807, and the cloud processing unit 215 determines whether the wait state is Idle in step S807. If it is determined that the wait state is Idle, the processing branches into step S808. For example, when Idle remains assigned to the wait state in the activation processing of FIG. 6, the processing branches into step S808. If it is determined that the wait state is Wait in step S807, the present processing ends. In a case where the wait state is Wait, which is a state where the certain period has not elapsed since connection or disconnection was made, the processing is suspended until the wait state becomes Idle after the elapse of the certain period. In this way, in the present embodiment, even if there is a change in the Web service setting, operations related to the Web service are not changed while the wait state is Wait.

In the next step S808, whether the connection status is Connect is determined. If it is determined that the connection status is Connect, the processing branches into step S809, and if it is determined that the connection status is Disconnect, the processing ends. In the next step S809, the action corresponding to the assignment in step S804 or S806 is executed. If stopping of the Web service was assigned in step S804, the CPU 201 stops operations as the server processing unit 211 and the search response unit 214. If starting of the Web service was assigned in step S806, the CPU 201 starts operations as the server processing unit 211 and the search response unit 214. A case where the connection status is Disconnect is considered a state where the connection with the cloud server 140 has been disconnected, and a case where the wait state is Wait is considered a state where the certain period has not elapsed since the connection; therefore, in this case, the execution of the action corresponding to the assignment in step S804 or S806 is deemed unnecessary, and the processing ends without the execution of the action.

Figure 9:
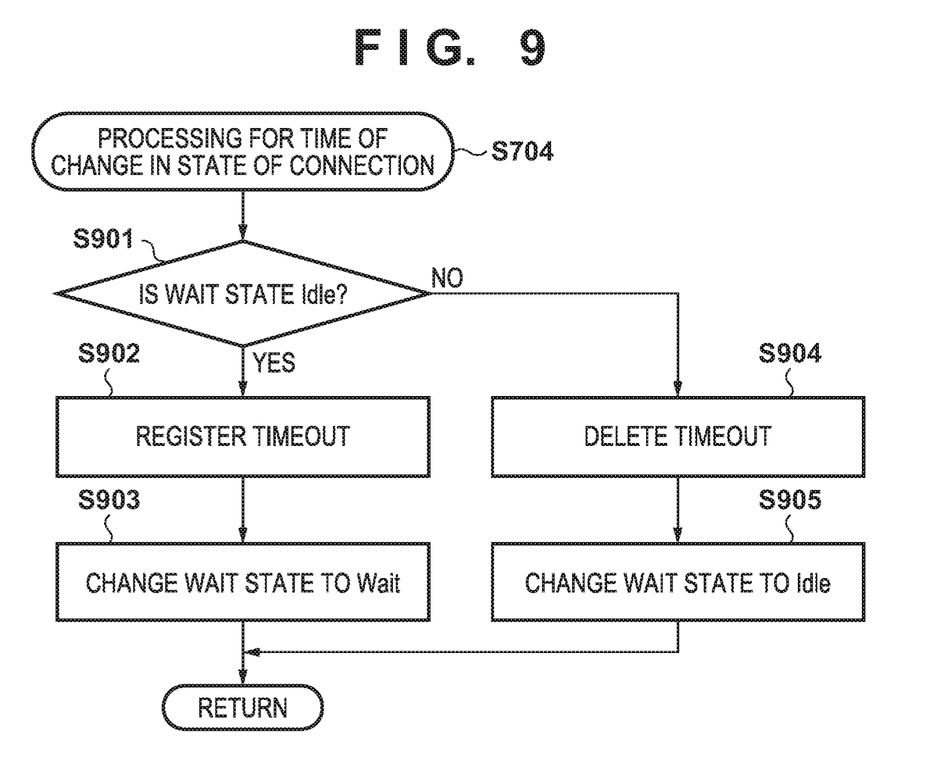
FIG. 9 is a flowchart showing an example of processing for the time of change in the state of connection corresponding to an exemplary embodiment.

Next, the processing for the time of change in the state of connection in step S704 of FIG. 7 will be described with reference to FIG. 9. FIG. 9 is a flowchart of processing for a case where the state of connection with the cloud server 140 has changed. Regarding the change in the state of connection, when the state of connection has changed, a timeout is used without immediately determining that disconnection or connection has been made; in this way, the prevention of chattering is realized. Starting and stopping of the Web service is costly because they are activation and termination of a process. As the state of connection may undergo chattering, a timeout is used to suppress costly activation and termination of a process. The present processing is executed in step S704 of FIG. 7 when the state of connection with the cloud server 140 has changed.

First, in step S901, the cloud processing unit 215 determines whether the wait state is Idle. If it is determined that the wait state is Idle, the processing branches into step S902, and if it is determined that the wait state is Wait, the processing branches into step S904. Here, the processing branches in accordance with a value of the wait state when the state of connection has changed.

The cloud processing unit 215 registers a timeout and starts measuring an elapsed period in the next step S902, and changes the wait state to Wait in the following step S903. Therefore, the timeout is set in either a case where the state of connection has changed from connected to disconnected, or a case where the state of connection has changed from disconnected to connected.

On the other hand, the cloud processing unit 215 deletes the timeout in step S904, and changes the wait state to Idle in the following step S905. In this way, when the state of connection has changed before the elapsed period reaches the timeout period after the wait state is set to Wait, the wait state is set back to Idle again. Once the processes of steps S904 and S906 have ended, the present processing ends. Note that in the flowchart of FIG. 9, even if the state of connection has changed, the setting value of the connection status itself is not changed, and only the setting value of the wait state is changed. This is because the connection status is changed after the timeout period has elapsed, in other words, after the same state of connection has elapsed for the certain period.

Figure 10:
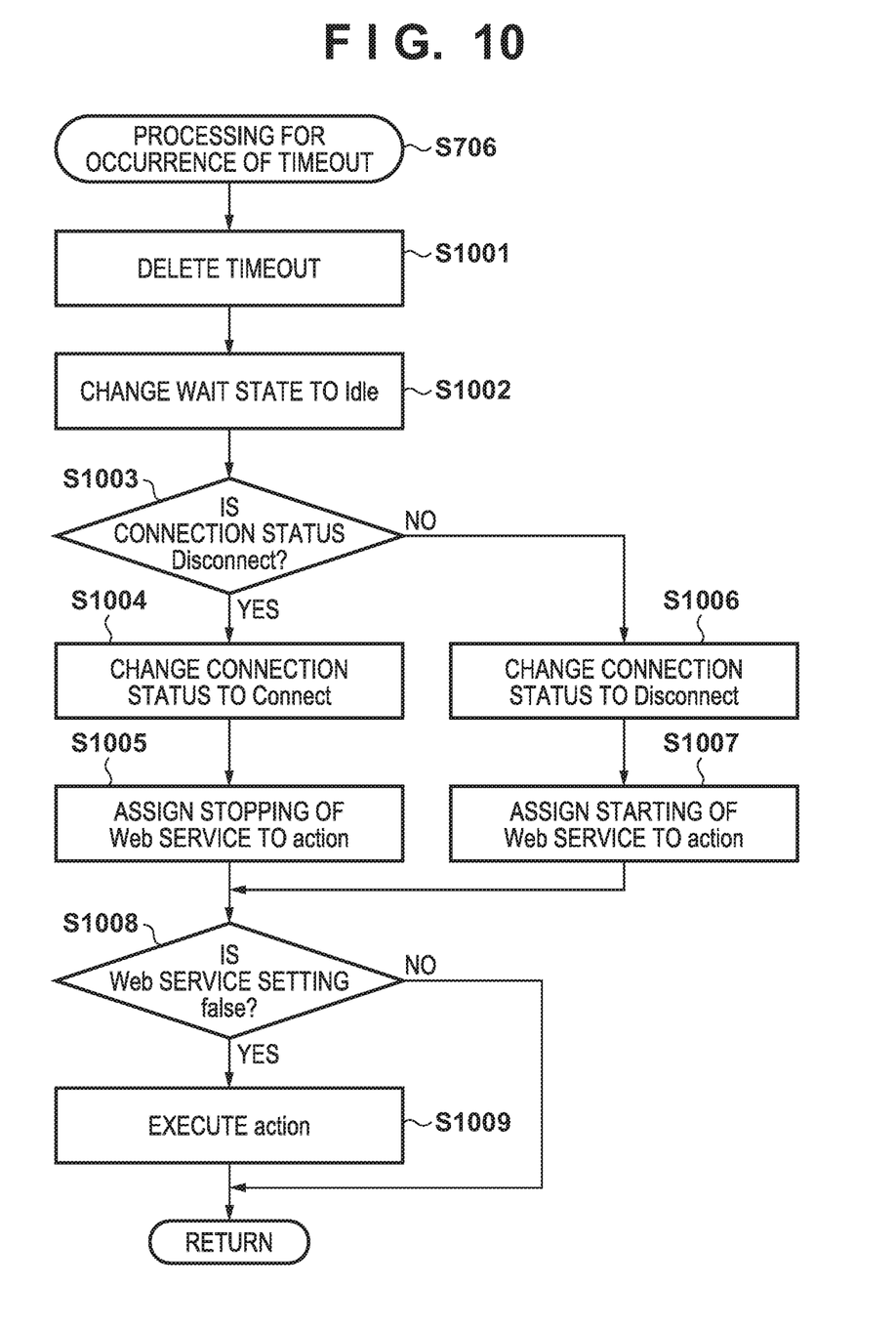
FIG. 10 is a flowchart showing an example of processing for the occurrence of a timeout corresponding to an exemplary embodiment.

Next, the details of the processing in step S706 of FIG. 7 will be described with reference to FIG. 10. FIG. 10 is a flowchart of processing that is executed upon the expiration of the timeout period that was registered by the cloud processing unit 215 in FIG. 9. The present processing is executed in step S706 of FIG. 7 when it is determined that the timeout has occurred. As the timeout occurs when the wait state is Wait, the cloud processing unit 215 first deletes the registered timeout in step S1001. In the next step S1002, the cloud processing unit 215 changes the wait state to Idle. Then, in step S1003, whether the connection status is Disconnect is determined. If it is determined that the connection status is Disconnect in step S1003, the processing branches into step S1004. In FIG. 9, when the state of connection has changed, the connection status is maintained without being changed, but the wait state is changed instead. Therefore, in step S1004, the cloud processing unit 215 waits until the certain period elapses, and changes the connection status to Connect. This is because when the value of the connection status is Disconnect and the wait state is Wait, it means that the timeout period has elapsed after the state of connection has changed from disconnected to connected. Thereafter, in step S1005, the cloud processing unit 215 assigns stopping of the Web service to an action as a callback.

If it is determined that the state of connection is Connect in step S1003, the processing branches into step S1006. In FIG. 9, when the state of connection has changed, the state of connection is maintained without being changed, but the wait state is changed instead. Therefore, in step S1006 also, the cloud processing unit 215 waits until the certain period elapses, and changes the connection status to Disconnect. This is because when the value of the connection status is Connect and the wait state is Wait, it means that the timeout period has elapsed after the state of connection has changed from connected to disconnected. Then, in step S1007, the cloud processing unit 215 assigns starting of the Web service to the setting value of the action.

After the processes of steps S1005 and S1007, the cloud processing unit 215 determines whether the setting value of the Web service setting is false in step S1008. At the time of activation (step S501), true is assigned to the setting value of the Web service setting, and the setting value is updated when a setting has been received from the cloud server 140 (steps S803, S805). If it is determined that the Web service setting is false in step S1008, the processing proceeds to step S1009, and the cloud processing unit 215 executes the action corresponding to the assignment in steps S1005, S1007. If stopping of the Web service was assigned to the setting value of the action, the CPU 201 stops operations as the server processing unit 211 and the search response unit 214. If starting of the Web service was assigned to the setting value of the action, the CPU 201 starts operations as the server processing unit 211 and the search response unit 214, and ends the present processing. If it is determined that the setting value of the Web service setting is true in step S1008, the cloud processing unit 215 ends the processing without executing the action. This is because it is determined that the Web service setting has higher priority than the change in the state of connection, and the change in the connected/disconnected state is ignored.

As described above, in the present embodiment, the state of connection between the network camera 110 and the cloud server 140 is monitored, and even if the state of connection has changed, the state of the provision of the Web service is maintained without being changed for a certain period. In this way, the Web service is stopped when it is determined that the connection is enabled with both of the state of connection with the cloud server 140 and the Web service setting taken into consideration; thus, high security can be maintained. In addition, when connection cannot be made with the cloud server 140, as the Web service is in the activated state, cause analysis can be promptly performed on the occurrence of a failure. Although the embodiments have been described above, the embodiments are not limited to the contents set forth above, and various modifications and changes can be made within the scope of their essential spirits.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-226726 filed on Dec. 3, 2018, which is hereby incorporated by reference herein in its entirety.

What is claimed is:

1. An image capturing apparatus, comprising a computer executing instructions that, when executed by the computer, cause the computer to function as:
   a communication unit configured to communicate with a client and a server via a network; and
   a processing unit configured to execute first processing for communication with the client and second processing for communication with the server,
   wherein the communication with the client and the communication with the server include transmission of an image captured by an image capturing unit,
   wherein the communication unit receives, from the server, a setting value indicating whether to execute the first processing or not, and
   wherein in a state where the communication unit has established the communication with the server after the first processing and the second processing have been started, the processing unit:
   stops the first processing if the received setting value indicates that the first processing is not to be executed; and
   does not stop the first processing if the received setting value indicates that the first processing is to be executed.

2. The image capturing apparatus according to claim 1, wherein
   the processing unit stops the first processing after the communication unit has established the communication with the server and after a certain period has elapsed.

3. The image capturing apparatus according to claim 2, further comprising a holding unit configured to hold the setting value,
   wherein when a setting value that the communication unit has newly received from the server causes the setting value held by the holding unit to be changed from the value indicating that the first processing is to be executed to the value indicating that the first processing is not to be executed, the processing unit does not stop the first processing until the certain period elapses.

4. The image capturing apparatus according to claim 1, wherein
   the processing unit starts the first processing when the communication performed by the communication unit with the server has been disconnected after the first processing has been stopped.

5. The image capturing apparatus according to claim 4, wherein
   after the communication performed by the communication unit with the server has been disconnected, the processing unit starts the first processing after a certain period has elapsed.

6. The image capturing apparatus according to claim 1, wherein
the processing unit functions as a Web server for the client by executing the first processing.

7. The image capturing apparatus according to claim 6, wherein
the first processing includes a response to a search request received from the client.

8. The image capturing apparatus according to claim 1, wherein the instructions further cause the computer to function as
a notification unit configured to give notification of a state of the communication with the server.

9. The image capturing apparatus according to claim 1, wherein
the processing unit does not stop the first processing in a case where the communication unit has not established the communication with the server.

10. A system comprising:
(i) an image capturing apparatus including a computer executing instructions that, when executed by the computer, cause the computer to function as:
a communication unit configured to communicate with a client and a server via a network; and
a processing unit configured to execute first processing for communication with the client and second processing for communication with the server,
wherein the communication with the client and the communication with the server include transmission of an image captured by an image capturing unit,
wherein the communication unit receives, from the server, a setting value indicating whether to execute the first processing or not, and
wherein in a state where the communication unit has established the communication with the server after the first processing and the second processing have been started, the processing unit:
stops the first processing if the received setting value indicates that the first processing is not to be executed and
does not stop the first processing if the received setting value indicates that the first processing is to be executed;
(ii) a server that stores the image captured by the image capturing apparatus; and
(iii) a client that obtains the image captured by the image capturing apparatus from the server or the image capturing apparatus.

11. A control method for an image capturing apparatus, the control method comprising:
communicating with a client and a server via a network; and
executing first processing for communication with the client and second processing for communication with the server,
wherein the communication with the client and the communication with the server include transmission of an image captured by an image capturing unit,
wherein in the communicating, a setting value indicating whether or not to execute the first processing is received from the server, and
wherein in a state where, in the communicating, the communication with the server has been established after the first processing and the second processing have been started, in the executing:
the first processing is stopped if the received setting value indicates that the first processing is not to be executed; and
the first processing is not stopped if the received setting value indicates that the first processing is to be executed.

12. A non-transitory computer-readable storage medium storing one or more programs for causing a computer to execute a control method for an image capturing apparatus, the control method comprising:
communicating with a client and a server via a network; and
executing first processing for communication with the client and second processing for communication with the server,
wherein the communication with the client and the communication with the server include transmission of an image captured by an image capturing unit,
wherein in the communicating, a setting value indicating whether or not to execute the first processing is received from the server, and
wherein in a state where, in the communicating, the communication with the server has been established after the first processing and the second processing have been started, in the executing:
the first processing is stopped if the received setting value indicates that the first processing is not to be executed; and
the first processing is not stopped if the received setting value indicates that the first processing is to be executed.

* * * * *